United States Patent
Kato et al.

(10) Patent No.: US 10,907,769 B2
(45) Date of Patent: Feb. 2, 2021

(54) PRESSURE VESSEL, LINER AND METHOD FOR MANUFACTURING A PRESSURE VESSEL

(71) Applicant: Mitsubishi Gas Chemical Company, Inc., Tokyo (JP)

(72) Inventors: Tomonori Kato, Kanagawa (JP); Nobuhiko Matsumoto, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 503 days.

(21) Appl. No.: 15/531,276

(22) PCT Filed: Oct. 1, 2015

(86) PCT No.: PCT/JP2015/077930
§ 371 (c)(1),
(2) Date: May 26, 2017

(87) PCT Pub. No.: WO2016/084475
PCT Pub. Date: Jun. 2, 2016

(65) Prior Publication Data
US 2017/0343158 A1    Nov. 30, 2017

(30) Foreign Application Priority Data

Nov. 28, 2014 (JP) ................. 2014-240952
Nov. 28, 2014 (JP) ................. 2014-240953

(51) Int. Cl.
*F17C 1/06* (2006.01)
*F17C 1/16* (2006.01)
(Continued)

(52) U.S. Cl.
CPC ............ *F17C 1/06* (2013.01); *C08G 69/26* (2013.01); *C08J 5/042* (2013.01); *C08J 5/06* (2013.01);
(Continued)

(58) Field of Classification Search
USPC .............. 220/901, 581–592, 560.04–560.15
See application file for complete search history.

(56) References Cited

U.S. PATENT DOCUMENTS

2009/0022920 A1* 1/2009 Vinarsky ............... F16L 9/123
                                                          428/36.2
2011/0108557 A1   5/2011 Tani et al.
(Continued)

FOREIGN PATENT DOCUMENTS

CN    102062211 A    5/2011
JP    H01-105099 A   4/1989
(Continued)

OTHER PUBLICATIONS

Office Action dated Mar. 12, 2019, in corresponding Japanese Patent Application No. 2014-240953.
(Continued)

*Primary Examiner* — Fenn C Mathew
*Assistant Examiner* — Jennifer Castriotta
(74) *Attorney, Agent, or Firm* — Fitch, Even, Tabin & Flannery LLP (57) ABSTRACT

Provided is a pressure vessel having an outer layer with an improved gas barrier property, a lightweight liner with an excellent gas barrier property, and a novel method for manufacturing a pressure vessel. The pressure vessel contains a liner and an outer layer of the liner, wherein the outer layer is configured by a composite material that contains a continuous fiber and a polyamide resin impregnated into the continuous fiber; the polyamide resin contains a structural unit derived from diamine and a structural unit derived from dicarboxylic acid; and 50 mol % or more of the structural unit derived from diamine is derived from xylylenediamine.

13 Claims, 1 Drawing Sheet

(51) Int. Cl.
  *C08G 69/26* (2006.01)
  *C08J 5/04* (2006.01)
  *C08J 5/06* (2006.01)
  *F16J 12/00* (2006.01)

(52) U.S. Cl.
  CPC ............ *F17C 1/16* (2013.01); *C08J 2377/06* (2013.01); *F16J 12/00* (2013.01); *F17C 2201/0109* (2013.01); *F17C 2203/0604* (2013.01); *F17C 2203/0663* (2013.01); *F17C 2209/21* (2013.01); *F17C 2221/011* (2013.01); *F17C 2221/012* (2013.01); *F17C 2221/013* (2013.01); *F17C 2221/014* (2013.01); *F17C 2221/016* (2013.01); *F17C 2221/033* (2013.01); *F17C 2221/035* (2013.01); *F17C 2260/036* (2013.01); *F17C 2270/01* (2013.01)

(56) References Cited

U.S. PATENT DOCUMENTS

| | | |
|---|---|---|
| 2012/0108125 A1 | 5/2012 | Elia et al. |
| 2013/0062806 A1 | 3/2013 | Mitadera |
| 2014/0034654 A1 | 2/2014 | Dullaert et al. |
| 2016/0010246 A1 | 1/2016 | Nakai et al. |

FOREIGN PATENT DOCUMENTS

| | | |
|---|---|---|
| JP | H09-280496 A | 10/1997 |
| JP | H11 230347 A | 8/1999 |
| JP | 2000-249294 A | 9/2000 |
| JP | 2005106142 A | 4/2005 |
| JP | 2010-038216 A | 2/2010 |
| JP | 2010-280873 A | 12/2010 |
| JP | 2014-501818 A | 1/2014 |
| JP | 2014-513250 A | 5/2014 |
| RU | 2426024 C2 | 8/2011 |
| WO | 2012/140785 A1 | 10/2012 |
| WO | 2014/136662 A1 | 9/2014 |

OTHER PUBLICATIONS

Office Action dated Sep. 20, 2018, in corresponding Chinese Patent Application No. 201580064738.7.
China Material Engineering Dictionary, vol. 10, 2006, p. 443.
International Search Report dated Dec. 28, 2015, for PCT/JP2015/077930 and English translation of the same (5 pages).
Office Action dated Mar. 4, 2019, in corresponding Russian Patent Application No. 2017122292.
Translation of the International Preliminary Report on Patentability (Chapter I or Chapter II) for PCT/JP2015/077930 dated Jun. 8, 2017; submitted herewith (7 Pages).
Extended European Search Report dated Jun. 28, 2018 issued in the corresponding European Patent Application No. 15863194.5.
Office Action dated Feb. 27, 2018 issued in the corresponding Chinese patent application No. 201580064738.7 (8 pages).

\* cited by examiner

PRESSURE VESSEL, LINER AND METHOD FOR MANUFACTURING A PRESSURE VESSEL

CROSS-REFERENCE TO RELATED APPLICATIONS

This application is a U.S. national phase application filed under 35 U.S.C. § 371 of International Application PCT/JP2015/077930, filed on Oct. 1, 2015, designating the United States, which claims priority from Japanese Application Numbers 2014-240952 and 2014-240953, each filed Nov. 28, 2014, which are hereby incorporated herein by reference in their entirety.

FIELD OF THE INVENTION

This invention relates to a pressure vessel, a liner and a method for manufacturing a pressure vessel, and particularly to a pressure vessel for storing various gases, and a liner.

BACKGROUND ART

Pressure vessels characterized by high gas barrier properties have been used for storing gas component such as oxygen, carbon dioxide, nitrogen, argon, LPG (liquefied petroleum gas), chlorofluorocarbon substitute, methane, hydrogen and so forth over a long period of time.

For example, Patent Literature 1 discloses a pressure vessel that is composed of a metal or resin liner, and a shell that covers the outer circumference of the liner and is composed of a fiber-reinforced plastic containing a reinforcing fiber and a resin, wherein the fiber-reinforced plastic has a compressive strength of 1700 MPa or larger, and an elongation percentage in the direction normal to the fiber of 1.2% or larger.

Patent Literature 2 discloses a pressure vessel that is composed of an inner shell having a gas barrier property, and a pressure-resistant outer shell provided so as to cover the inner shell. The outer shell is made of a fiber-reinforced plastic that contains a reinforcing fiber (X) having an elongation percentage of 1 to 3%, a reinforcing fiber (Y) having an elongation percentage 1.3 times or more larger than that of the reinforcing fiber, and a resin. The reinforcing fiber (Y) in a bundled form is spirally wound around the trunk of the vessel.

Patent Literature 3 discloses a pressure vessel that includes a resin liner layer that blocks leakage of a predetermined fluid; a first layer made of a fiber-reinforced plastic, formed outside the liner layer, and is pressure resistant; and a second layer disposed between the liner layer and the first layer, and is made of a plastic having an elongation percentage larger than that of the first layer.

Patent Literature 4 discloses a gas bomb having the body thereof configured by a plastic inner cylinder, a thin metal layer and a fiber-reinforced plastic layer.

CITATION LIST

Patent Literature

[Patent Literature 1] JP-A-2000-249294
[Patent Literature 2] JP-A-H09-280496
[Patent Literature 3] JP-A-2010-038216
[Patent Literature 4] JP-A-H01-105099

SUMMARY OF THE INVENTION

Technical Problem

As described above, there has been known a pressure vessel having a liner and an outer layer, wherein the outer layer is formed by using a fiber reinforced plastic, from the viewpoint of reducing the weight of pressure vessel. It is now considered that, if the outer layer that covers the liner were given a further improved gas barrier property, the pressure vessel will more effectively prevent leakage of gas, even when the liner should be broken or accidentally have a pinhole.

It is therefore a first objective of this invention to solve the above-described problems, and to provide a pressure vessel characterized by a high gas barrier property of the outer layer. This invention is also to provide a novel method for manufacturing a pressure vessel.

There has also been discussed to use a resin liner, from the viewpoint of weight reduction of the pressure vessel, and for the purpose of reinforcing the resin liner, and there has been provided an outer layer made of a fiber reinforced plastic, to the outer circumference of the resin liner. The resin liner may however allow a gas contained in the pressure vessel to pass through the wall thereof. If there should be a gap between the liner and the outer layer, the gas may be trapped in the gap, to unfortunately deform the pressure vessel.

It is therefore a second objective of this invention to solve the above-described problems, and to provide a lightweight liner with an excellent gas barrier property, and to provide a pressure vessel having such liner.

Solution to Problem

After investigations conducted under the situation, the present inventors found that the problems above may be solved by employing, as the outer layer or the liner of the pressure vessel, a polyamide resin, in particular a polyamide resin containing a structural unit derived from diamine and a structural unit derived from dicarboxylic acid, wherein 50 mol % or more of the structural unit derived from diamine is derived from xylylenediamine. More specifically, the problems were solved by means <1> below, and preferably by means <2> to <25>.

<1> A pressure vessel comprising: a liner and an outer layer of the liner, wherein the outer layer is configured by a composite material that contains a continuous fiber and a polyamide resin impregnated into the continuous fiber; the polyamide resin contains a structural unit derived from diamine and a structural unit derived from dicarboxylic acid; and 50 mol % or more of the structural unit derived from diamine is derived from xylylenediamine.

<2> The pressure vessel of <1>, wherein the outer layer has a gas transmission coefficient at 23° C. and 50% relative humidity of 0.10 ml·mm/m²·day·atm or smaller.

<3> The pressure vessel of <1> or <2>, wherein the outer layer has a void ratio of 10% or smaller.

<4> The pressure vessel of any one of <1> to <3>, wherein 70 mol % or more of the structural unit derived from dicarboxylic acid is derived from a straight chain aliphatic α,ω-dicarboxylic acid having 4 to 20 carbon atoms.

<5> The pressure vessel of any one of <1> to <4>, wherein 70 mol % or more of the structural unit derived from diamine is derived from metaxylylenediamine.

<6> The pressure vessel of any one of <1> to <3>, wherein 70 mol % or more of the structural unit derived from diamine is derived from metaxylylenediamine, and 70 mol % or more of the structural unit derived from dicarboxylic acid is derived from at least either one of adipic acid and sebacic acid.

<7> The pressure vessel of any one of <1> to <3>, wherein 70 mol % or more of the structural unit derived from diamine is derived from metaxylylenediamine, and 70 mol % or more of the structural unit derived from dicarboxylic acid is derived from adipic acid.

<8> The pressure vessel of any one of <1> to <7>, wherein the continuous fiber is at least one fiber selected from carbon fiber and glass fiber.

<9> The pressure vessel of any one of <1> to <8>, wherein the ratio of the continuous fiber in the outer layer is 10 to 80 V/V %.

<10> The pressure vessel of any one of <1> to <9>, wherein the liner contains a resin as a main component.

<11> The pressure vessel of any one of <1> to <9>, wherein the liner contains a polyamide resin as a main component.

<12> The pressure vessel of any one of <1> to <9>, wherein the liner contains a polyamide resin as a main component, the polyamide resin contains a structural unit derived from diamine and a structural unit derived from dicarboxylic acid, and 50 mol % or more of the structural unit derived from diamine is derived from xylylenediamine.

<13> A liner of a pressure vessel, wherein the liner is composed of a composite material having a polyamide resin impregnated into a continuous fiber.

<14> The liner of <13>, wherein the polyamide resin contains a structural unit derived from diamine and a structural unit derived from dicarboxylic acid, and 50 mol % or more of the structural unit derived from diamine is xylylenediamine.

<15> The liner of <13> or <14>, having a gas transmission coefficient at 23° C. and 50% relative humidity of 0.10 cc·mm/m²·day·atm or smaller.

<16> The liner of any one of <13> to <15>, wherein the liner has a void ratio of 10% or smaller.

<17> The liner of any one of <14> to <16>, wherein 70 mol % or more of the structural unit derived from diamine is derived from metaxylylenediamine.

<18> The liner of any one of <14> to <17>, wherein 70 mol % or more of the structural unit derived from dicarboxylic acid is derived from a straight chain aliphatic α,ω-dicarboxylic acid having 4 to 20 carbon atoms.

<19> The liner of any one of <14> to <16>, wherein 70 mol % or more of the structural unit derived from diamine is derived from metaxylylenediamine, and 70 mol % or more of the structural unit derived from dicarboxylic acid is derived from at least either one of adipic acid and sebacic acid.

<20> The liner of any one of <14> to <16>, wherein 70 mol % or more of the structural unit derived from diamine is derived from metaxylylenediamine, and 70 mol % or more of the structural unit derived from dicarboxylic acid is derived from adipic acid.

<21> The liner of any one of <13> to <20>, wherein the continuous fiber is at least one fiber selected from carbon fiber and glass fiber.

<22> The liner of any one of <13> to <21>, wherein the ratio of the continuous fiber in the liner is 10 to 80 V/V %.

<23> A pressure vessel comprising the liner described in any one of <13> to <22>.

<24> A method for manufacturing a pressure vessel, the method comprising: applying a composite material having a polyamide resin impregnated into a continuous fiber to the outer circumference of a liner; and, heating the composite material at a temperature not lower than the melting point of the polyamide resin, wherein the polyamide resin contains a structural unit derived from diamine and a structural unit derived from dicarboxylic acid, and 50 mol % or more of the structural unit derived from diamine is derived from xylylenediamine.

<25> The method for manufacturing a pressure vessel of <24>, wherein the applying the composite material having a polyamide resin impregnated into a continuous fiber to the outer circumference of the liner is followed by the heating the composite material at a temperature not lower than the melting point of the polyamide resin.

Advantageous Effects of Invention

According to this invention, it now became possible to provide a pressure vessel having an outer layer with an improved gas barrier property, a lightweight liner with an excellent gas barrier property, and a novel method for manufacturing a pressure vessel.

DESCRIPTION OF MODES

This invention will be detailed below. In this specification, all numerical ranges given using "to", placed between numerals, mean the ranges containing both numerals as the lower and upper limit values.

Pressure Vessel

The first mode of this invention relates to a pressure vessel that includes a liner, and an outer layer of the liner; the outer layer is configured by a composite material that contains a continuous fiber, and a polyamide resin impregnated into the continuous fiber; and the polyamide resin contains a structural unit derived from diamine and a structural unit derived from dicarboxylic acid, where 50 mol % or more of the structural unit derived from diamine is derived from xylylenediamine. By using such composite material as the outer layer, the outer layer will have an improved gas barrier property.

Although the mechanism remains unclear, it is presumed that the methaxylylene skeleton of the polyamide resin contributes to improve the gas barrier property.

Figure 1:
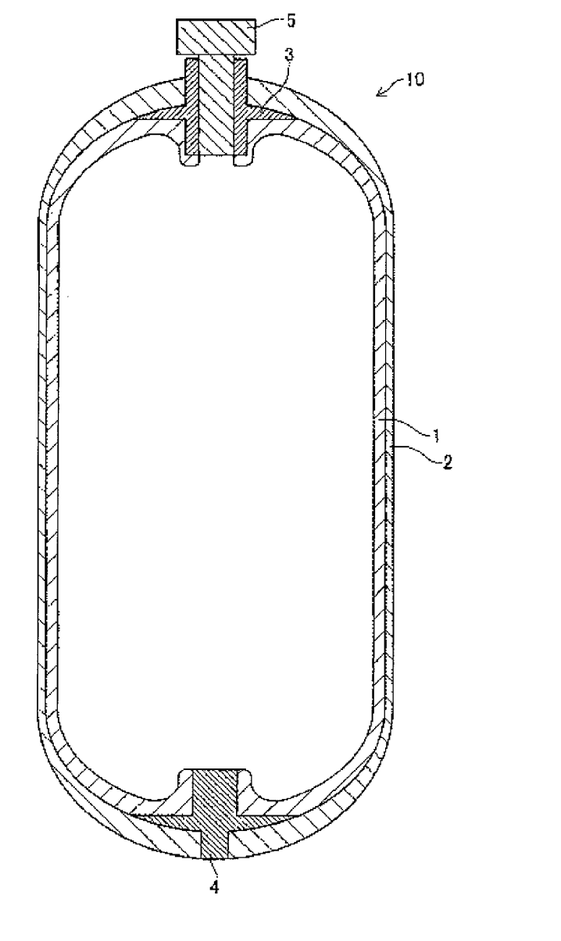
FIG. 1 is a schematic cross-sectional view illustrating an example of the structure of a pressure vessel according to a first mode of this invention.

The configuration of the first mode of this invention will further be detailed, referring to FIG. 1.

<Liner>

A liner 1 has an inner space in which a gas is filled, and is typically given in the form of hollow article. Although materials composing the liner are not specifically limited so long as they do not depart from the scope of this invention, exemplified are liners mainly composed of resin (occasionally referred to as "resin liner", hereinafter), and liners mainly composed of metal (occasionally referred to as "metal liner", hereinafter). The resin liner is preferable.

Now, the liner mainly composed of resin means that the resin is the most abundant component out of all materials composing the liner, where the resin typically accounts for 50% by mass or more, and preferably 80% by mass or more. The same will also apply to the major component of the metal liner.

The resin used for the resin liner is exemplified by thermoplastic resin and thermosetting resin, and more specifically exemplified by polyolefin resin, polyethylene resin, polypropylene resin, polyamide resin, acrylonitrile-butadiene-styrene copolymer (ABS) resin, polybutylene terephthalate resin, polyacetal resin and polycarbonate resin. Polyamide resin is preferable. By using polyamide resin, the resin liner will have an improved compatibility with the outer layer, and thereby the resin liner will have an improved adhesiveness to the outer layer. In particular, the resin most abundant in the resin liner and the resin most abundant in the outer layer are preferably same.

The resin liner may be formed by direct blow molding or injection molding. When the resin liner is formed by injection molding, a hollow container may be obtained typically by forming parts as if the liner were longitudinally split (preferably halved), and then by welding the parts typically by ultrasonic welding.

Resins usable for the metal liner are exemplified by light alloys such as aluminum alloy and magnesium alloy.

The metal liner is preferably provided with the outer layer, since even if the liner should accidentally have a pinhole, the outer layer can suppress leakage of gas from the pressure vessel.

The thickness of the liner may be, but not specifically limited to, 100 μm to 2000 μm for example, preferably 200 μm to 1500 μm, and particularly 300 μm to 1200 μm. In particular when the resin liner is used, the thickness of liner preferably falls in the above-described ranges.

A preferred embodiment of the liner used in the first mode of this invention is exemplified by a liner mainly composed of a polyamide resin. The polyamide resin composing such liner preferably contains a structural unit derived from diamine and a structural unit derived from dicarboxylic acid, wherein 50 mol % or more of the structural unit derived from diamine is preferably derived from xylylenediamine. Preferable ranges of the polyamide resin composing the liner are same as those of polyamide resin used for the composite material described later. In particular, 90% by mass or more of the polyamide resin used for the composite material, and 90% by mass or more of the polyamide resin used for the liner, are preferably the same polyamide resin. With such configuration, the adhesion between the liner and the outer layer may further be improved.

<Outer Layer>

The Outer layer 2 is formed so as to cover the outer circumference of the liner 1, and is configured by a composite material that contains a continuous fiber and a polyamide resin impregnated into the continuous fiber. In other words, in a typical pressure vessel of the first mode of this invention, the body of the liner is covered with the composite material without a break.

While the outer layer is typically composed of the composite material only, this does not preclude that the outer layer can contain any other component without departing from the spirit of this invention. For example, an adhesive for bonding the composite material is exemplified. The adhesive is exemplified by an epoxy-based adhesive, which is commercially available for example under the trade name of Araldite from Huntsman.

The outer layer of the pressure vessel of the first mode of this invention preferably has a gas transmission coefficient at 23° C. and 50% relative humidity of 0.10 ml·mm/m$^2$·day·atm or smaller, and may also be 0.01 ml·mm/m$^2$·day·atm or smaller. The lower limit value may typically be, but not specifically limited to, 0.0001 ml·mm/m$^2$·day·atm or larger taking the practicability into consideration.

Gases to be considered in terms of gas transmission coefficient are not specifically limited, so long as they can be enclosed in the pressure vessel of the first mode of this invention, but typically those that can exist in a gaseous form at 25° C., 1 atm, and are preferably less reactive. Specific examples include oxygen, carbon dioxide, nitrogen, argon, LPG, chlorofluorocarbon substitute, methane and hydrogen.

The outer layer of the pressure vessel of the first mode of this invention preferably has a void ratio of 15% or smaller, more preferably 10% or smaller, even more preferably 8% or smaller, yet more preferably 6% or smaller, yet more preferably 5% or smaller, and even may be 4% or smaller.

The void ratio in the context of this invention is a value specified by the method described later in EXAMPLES. If the measuring instruments described in EXAMPLES are hardly accessible due to discontinued production or so, other equivalent measuring instruments may be used. The same will apply also to the method of measurement described later.

By reducing the void ratio, the gas barrier property may be improved. The void ratio may be reduced typically by reducing the void ratio of the composite material.

The thickness of the outer layer is preferably, but not specifically limited to, 100 to 4000 μm, and more preferably 400 to 2000 μm.

The ratio of the continuous fiber in the outer layer is preferably 10 V/V % or larger, more preferably 20 V/V % or larger, even more preferably 30 V/V % or larger, yet more preferably 40 V/V % or larger, and may particularly be 45 V/V % or larger. The ratio is also preferably 80 V/V % or smaller, more preferably 70 V/V % or smaller, even more preferably 60 V/V % or smaller, and may particularly be 55 V/V % or smaller.

Now the notation "V/V %" means the ratio of the volume of the continuous fiber in the outer layer, relative to the volume of the outer layer. The ratio of the continuous fiber in the outer layer is specified by a value measured by the method described later in EXAMPLES.

The outer layer in the first mode of this invention preferably has therein the continuous fiber arranged in order. "Arranged in order" means that 70% by mass or more of the continuous fiber contained in the outer layer is aligned with a certain directionality. "A certain directionality" is exemplified by spiral, vertical and lateral directions, and combination of them. "Spiral, vertical and lateral directions" in the context of this invention not only include strict spiral, vertical and lateral directions, but also those containing errors that are usually acceptable by those skilled in the art.

<<Composite Material>>

The composite material used in the first mode of this invention contains the continuous fiber and the polyamide resin impregnated into the continuous fiber, and may be composed of the continuous fiber and a polyamide resin composition impregnated into the continuous fiber.

In the composite material used in the first mode of this invention, the continuous fiber and the polyamide resin preferably accounts for 80% by mass or more of the total.

The composite material used in the first mode of this invention is obtained by impregnating the polyamide resin or polyamide resin composition into the continuous fiber. The composite material in the first mode of this invention will suffice if the polyamide resin is kept impregnated into the continuous fiber in the final form of pressure vessel. Accordingly, the polyamide resin or the polyamide resin composition may be formed by applying the composite material, having been impregnated into the continuous fiber, to the outer circumference of the liner; or by applying a fabric or commingled yarn, composed of the polyamide resin fiber and the continuous fiber, to the outer circumference of the liner, followed by heating, so as to impregnate the polyamide resin into the continuous fiber. Still alternatively, the continuous fiber may be applied to the outer circumference of the liner, and the polyamide resin may be impregnated thereto.

For the case where the composite material, obtained by impregnating the polyamide resin or the polyamide resin composition into the continuous fiber, is applied to the outer circumference of the liner, the composite material may be manufactured by any of known methods. Specific examples of the methods include a method of impregnating a molten polyamide resin into the continuous fiber, having been paralleled in one direction, while opening the continuous fiber; and a method of impregnating the polyamide resin by heating a stack of the unidirectionally paralleled continuous fiber (for example, carbon fiber sheet) and a polyamide resin film, followed by heating. The impregnation temperature needs be higher than the melting temperature of the polyamide resin or the polyamide resin composition, and preferably in the range from (melting point+10° C. or higher) to (thermal decomposition temperature–20° C.) in general, although variable depending on type and molecular weight of the polyamide resin. Impregnation may be proceeded under pressure, preferably at 1 MPa or above, more preferably 5 MPa or above, and even more preferably 10 MPa or above. The heating under pressure is preferably conducted in a reduced pressure, and particularly in vacuo. Under such conditions, the obtainable outer layer will have a void ratio successfully reduced.

The heating under pressure applied through rollers will give a tape-like product. The tape-like composite material may have a width of typically 120 to 250 mm.

An embodiment of applying the continuous fiber to the outer circumference of the liner, and then impregnating the polyamide resin will be explained later under the title of "Method for manufacturing Pressure Vessel".

The polyamide resin and the continuous fiber in the first mode of this invention will be explained below.

<<Polyamide Resin>>

The polyamide resin contained in the composite material according to the first mode of this invention contains the structural unit derived from diamine and the structural unit derived from dicarboxylic acid, wherein 50 mol % or more of the structural unit derived from diamine is derived from xylylenediamine.

The xylylene structural unit derived from diamine preferably accounts for 70 mol % or more of the structural unit derived from diamine, and more preferably 80 mol % or more. Although the xylylenediamine may be any of metaxylylenediamine, paraxylylenediamine and mixture of them, it preferably contains at least metaxylylenediamine. Metaxylylene structural unit derived from diamine preferably accounts for 70 mol % or more of the structural unit derived from diamine, and more preferably accounts for 80 mol % or more of it.

Diamine for composing the structural unit derived from diamine, other than xylylenediamine, is exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethyl-phexamethylenediamine; alicyclic diamines such as 1,3-bis(aminomethyl)cyclohexane, 1,4-bis (aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decaline, and bis(aminomethyl)tricyclodecane; and aromatic diamines such as bis(4-aminophenyl)ether, paraphenylenediamine, and bis(aminomethyl)naphthalene. They may be used independently, or in combination of two or more species.

When the diamines other than xylylenediamine is used as the diamine component, the ratio of use is less than 50 mol % of the total structural unit derived from diamines, preferably 30 mol % or less, more preferably 1 to 25 mol %, and particularly 5 to 20 mol %.

A constituent unit derived from a straight chain aliphatic $\alpha,\omega$-dicarboxylic acid having 4 to 20 carbon atoms preferably accounts for 50 mol % or more of the structural unit derived from dicarboxylic acid, more preferably 70 mol % or more, and even more preferably 80 mol % or more.

The straight chain aliphatic $\alpha,\omega$-dicarboxylic acid having 4 to 20 carbon atoms is more preferably a straight chain aliphatic $\alpha,\omega$-dicarboxylic acid having 6 to 9 carbon atoms. Specific examples of the straight chain aliphatic $\alpha,\omega$-dicarboxylic acid having 4 to 20 carbon atoms include aliphatic dicarboxylic acids such as succinic acid, glutaric acid, pimelic acid, suberic acid, azelaic acid, adipic acid, sebacic acid, undecanedioic acid, and dodecanedioic acid. They may be used independently, or in combination of two or more species. From the viewpoint of making the melting point of the polyamide resin suitable for molding or forming, adipic acid or sebacic acid is preferable, and adipic acid is particularly preferable.

The dicarboxylic acid component other than the straight chain aliphatic $\alpha,\omega$-dicarboxylic acid having 4 to 20 carbon atoms is exemplified by phthalic acids such as isophthalic acid, terephthalic acid and orthophthalic acid; and naphthalenedicarboxylic acids that include isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid.

These dicarboxylic acid components may be used independently, or in combination of two or more species.

Besides the diamine component and the dicarboxylic acid component, also lactams such as ε-caprolactam and laurolactam; and aliphatic aminocarboxylic acids such as aminocaproic acid and aminoundecanoic acid are usable as the component composing the polyamide resin, without damaging the effects of this invention.

As a first embodiment of the polyamide resin used in the first mode of this invention, exemplified is a polyamide resin in which 70 mol % or more of the structural unit derived from diamine is derived from metaxylylenediamine, and 70 mol % or more of the structural unit derived from dicarboxylic acid is derived from at least either one of adipic acid and sebacic acid (more preferably adipic acid). With such configuration, the gas barrier property will tend to improve.

As a second embodiment of the polyamide resin used in the first mode of this invention, exemplified is a polyamide resin in which 70 mol % or more of the structural unit derived from diamine is derived from xylylenediamine, 70 mol % or more of the structural unit derived from dicarboxylic acid is derived from straight chain aliphatic $\alpha,\omega$-dicarboxylic acid having 4 to 20 carbon atoms and/or isophthalic acid, and the molar ratio of the constituent unit derived from the straight chain aliphatic $\alpha,\omega$-dicarboxylic acid having 4 to 20 carbon atoms and the constituent unit derived from isophthalic acid is 30:70 to 100:0. With such configuration, the formability will be improved. When the isophthalic acid-derived constituent unit is contained, the ratio thereof is preferably 1 to 30 mol % of the total structural unit derived from dicarboxylic acids. The ratio particularly falls within the range from 5 to 20 mol %.

As a third embodiment of the polyamide resin used in the first mode of this invention, exemplified is a polyamide resin of the first or second embodiment, having a number-average molecular weight (Mn) of 6,000 to 30,000, wherein 0.5 to 5% by mass of the polyamide resin has a molecular weight of 1,000 or smaller.

With the number-average molecular weight (Mn) controlled within the range from 6,000 to 30,000, the composite material will have an improved strength. The number-average molecular weight (Mn) is preferably 8,000 to 28,000, more preferably 9,000 to 26,000, even more preferably 10,000 to 24,000, yet more preferably 11,000 to 22,000, and particularly 12,000 to 20,000. Within these ranges, the heat resistance, elastic modulus, dimensional stability, and formability will be improved.

The number-average molecular weight (Mn) in this context is calculated by the equation below, using the terminal amino group concentration [NH$_2$] (microequivalent/g) and the terminal carboxyl group concentration [COOH] (microequivalent/g) of the polyamide resin:

Number-average molecular weight (Mn)=2,000,000/([COOH]+[NH$_2$])

The polyamide resin in the third embodiment preferably contains 0.5 to 5% by mass of a component having a molecular weight of 1,000 or smaller. With a predetermined range of content of such low-molecular polyamide resin component, the polyamide resin will have an improved impregnation performance, and will have an improved fluidity around the reinforcing fibers of the polyamide resin, and thereby voids are suppressed from generating during molding.

The content of the component having a molecular weight of 1,000 or smaller is preferably 0.6 to 4.5% by mass, more preferably 0.7 to 4% by mass, even more preferably 0.8 to 3.5% by mass, yet more preferably 0.9 to 3% by mass, and particularly 1 to 2.5% by mass.

The content of the low-molecular-weight component having a molecular weight of 1,000 or smaller may be controlled by properly adjusting melt polymerization conditions such as the temperature and pressure during polymerization of the polyamide resin, and the rate of dropwise addition of diamine. In particular, the ratio of low-molecular weight component is freely adjustable, particularly by removing the component by reducing the pressure of a reaction vessel in the later stage of melt polymerization. Alternatively, the low-molecular-weight component may be removed by extracting, with hot water, the polyamide resin having been produced by melt polymerization, or by solid phase polymerization subsequent to the melt polymerization under reduced pressure. In the solid phase polymerization, the content of the low-molecular-weight component may freely be controlled by properly adjusting the temperature or the degree of pressure reduction. Still alternatively, the content may controlled by later adding the low-molecular-weight component having a molecular weight of 1,000 or smaller, to the polyamide resin.

The content of the component having a molecular weight of 1,000 smaller may be measured by gel permeation chromatography (GPC) using "HLC-8320GPC" from Tosoh Corporation, and may be determined as a standard polymethyl methacrylate (PMMA) equivalent value. Measurement may be conducted by using two TSKgel Super HM-H columns combined with a refractive index (RI) detector, and a 10 mmol/L sodium trifluoroacetate solution in hexafluoroisopropanol (HFIP) as an eluant, at a resin concentration of 0.02% by mass, a column temperature of 40° C., and a flow rate of 0.3 ml/min. The analytical curve is prepared by dissolving PMMA in HFIP, at six levels of concentration.

The polyamide resin used in the first mode of this invention has a molecular weight dispersion (weight-average molecular weight/number-average molecular weight (Mw/Mn)) of preferably 1.8 to 3.1, more preferably 1.9 to 3.0, and even more preferably 2.0 to 2.9. With the molecular weight dispersion controlled within these ranges, it will be easier to obtain a composite material with an excellent mechanical characteristic.

The molecular weight dispersion of polyamide resin may be controlled by suitably selecting the types and amount of consumption of an initiator or a catalyst used for the polymerization, and reaction conditions including the reaction temperature, pressure and time. The polyamide resin may also be obtained by mixing two or more types of polyamide resin obtained under different polymerization conditions and thus having different weight-average molecular weights or number-average molecular weights, or still alternatively by fractional precipitation of the polyamide resin after polymerized.

The molecular weight dispersion may be determined by GPC, and more specifically, may be obtained as a standard polymethyl methacrylate equivalent value, by using "HLC-8320GPC" system from Tosoh Corporation, with two "TSKgel Super HM-H" columns from Tosoh Corporation combined with a refractive index (RI) detector, and a 10 mmol/L sodium trifluoroacetate solution in hexafluoroisopropanol (HFIP) as an eluant, at a resin concentration of 0.02% by mass, a column temperature of 40° C., and a flow rate of 0.3 ml/min. The analytical curve is prepared by dissolving PMMA in HFIP, at six levels of concentration.

The polyamide resin used in the first mode of this invention, when given in the form of monolayer film of 100 μm thick, preferably has a tensile modulus measured in compliance with JIS K7127 of 1.2 GPa or larger, and more preferably 1.5 to 4.0 GPa.

The polyamide resin, when given in the form of monolayer film of 100 μm thick, preferably has a tensile rupture strength measured in compliance with JIS K7127 of 3 MPa or larger, and more preferably 5 to 100 MPa.

The polyamide resin preferably has a melting point within the range from 170 to 330° C., and more preferably from 200 to 320° C., from the viewpoint of heat resistance and melt formability.

The melting point in this context means a temperature at which an endothermic peak becomes deepest in DSC (differential scanning calorimetry) during a heating process. The glass transition temperature in this context is measured after once heating and melting a sample so as to cancel any influences on the thermal history, and by heating it again. The measurement may be conducted typically by using "DSC-60" from Shimadzu Corporation, approximately 5 mg of the sample, and nitrogen as an atmospheric gas fed at a flow rate of 30 ml/min, at a heating speed of 10° C./min from room temperature up to a temperature above a predicted melting point so as to heat and melt the sample, wherein the melting point may be determined from the temperature where an endothermic peek becomes deepest. The glass transition point may be determined by quickly quenching the molten polyamide resin with dry ice, and then re-heating it up to a temperature above the melting point.

The polyamide resin may be produced by, but not specifically limited to, a method and under conditions that are freely selectable. For example, the polyamide resin may be manufactured by heating a salt, composed of a diamine component (diamine such as metaxylylenediamine) and a dicarboxylic acid component (dicarboxylic acid such as straight chain aliphatic α,ω-dicarboxylic acid having 4 to 20 carbon atoms), under pressure with the presence of water, and by allowing the mixture to polymerize while removing the initially added water and water released from the condensation process. The polyamide resin may alternatively be produced by adding a diamine component (diamine such as xylylenediamine) directly to a molten dicarboxylic acid component (dicarboxylic acid such as straight chain aliphatic α,ω-dicarboxylic acid having 4 to 20 carbon atoms), and then allowing polycondensation to proceed under normal pressure. In this case, in order to keep a uniform liquid state of the reaction system, the polycondensation is allowed to proceed by continuously adding the diamine component to the dicarboxylic acid component, while heating the reaction system so that the reaction temperature will not fall below the melting points of the resultant oligoamide and polyamide.

The composite material used in the first mode of this invention may be an article obtained by impregnating a so-called polyamide resin composition, containing a polyamide resin other than the above-described xylylenediamine-based polyamide resin, and an elastomer component, into a continuous fiber.

Such other polyamide resin is exemplified by polyamide 66, polyamide 6, polyamide 46, polyamide 6/66, polyamide 10, polyamide 612, polyamide 11, polyamide 12, polyamide 66/6T composed of hexamethylenediamine, adipic acid and terephthalic acid, and polyamide 6I/6T composed of hexamethylenediamine, isophthalic acid and terephthalic acid. The other resin to be mixed is preferably at least either of polyamide 66 and polyamide 6.

When the polyamide resin composition contains such other polyamide resin, the content thereof, given by the ratio by weight of xylylenediamine-based polyamide resin and the other polyamide resin, is preferably 95:5 to 25:75, more preferably 95:5 to 51:49, even more preferably 95:5 to 60:40, and particularly 90:10 to 70:30.

In another embodiment, the polyamide resin composition may contain substantially no other polyamide resin. "May contain substantially no . . . " in this context means, for example, that the content is not larger than 5% by mass, and more preferably not larger than 1% by mass, of the polyamide resin contained in the polyamide resin composition.

The elastomer component employable herein may be any known elastomers including polyolefinic elastomer, diene-based elastomer, polystyrene-based elastomer, polyamide-based elastomer, polyester-based elastomer, polyurethane-based elastomer, fluorine-containing elastomer, and silicone-based elastomer, wherein polyolefinic elastomer and polystyrene-based elastomer are preferable. From the viewpoint of adding compatibility with the polyamide resin, the elastomer may also be modified elastomers obtained by modification using α,β-unsaturated carboxylic acid, anhydride thereof, acrylamide, or derivative thereof, under the presence or absence of a radical initiator.

The amount of mixing of the elastomer, when contained in the polyamide resin composition, is preferably 5 to 20% by mass of the polyamide resin composition, and more preferably 10 to 15% by mass.

In another embodiment, the polyamide resin composition may contain substantially no elastomer. "Contain substantially no . . . " in this context typically means that the content is 3% by mass or less of the polyamide resin composition, and more preferably 1% by mass or less.

The above-described polyamide resin composition may be composed of a single polyamide resin, or may be a blend of two or more polyamide resins. The polyamide resin composition in the first mode of this invention contains a structural unit derived from diamine and a structural unit derived from dicarboxylic acid, wherein a polyamide resin in which xylylenediamine accounts for 50 mol % or more of the structural unit derived from diamine preferably accounts for 30% by mass or more of the total, more preferably 50% by mass or more, and even more preferably 70% by mass or more.

The polyamide resin composition used in the first mode of this invention may be blended with a single species, or two or more species of resin selected from polyester resin, polyolefin resin, polyphenylene sulfide resin, polycarbonate resin, polyphenylene ether resin and polystyrene resin, without adversely affecting the purpose and effect of this invention. The amount of addition of these resins is preferably 10% by mass or smaller, and more preferably 1% by mass or smaller.

The polyamide resin composition used in the first mode of this invention may further be blended with an additive such as antioxidant, stabilizer such as heat stabilizer, anti-hydrolysis performance modifier, weathering stabilizer, matting agent, UV absorber, nucleating agent, plasticizer, dispersion aid, flame retardant, antistatic agent, anti-coloring agent, anti-gelling agent, colorant or mold releasing agent, without adversely affecting the purpose and effect of this invention. For details of these additives, the description in paragraphs 0130 to 0155 of JP-B1-4894982 may be taken into consideration, wherein the content of which is incorporated into this specification.

<<Continuous Fiber>>

The composite material used in the first mode of this invention contains a continuous fiber. The continuous fiber means a fiber bundle having a length exceeding 10 cm. Average fiber length of the continuous fiber bundle used in this invention is preferably, but not specifically limited to, 1 to 10,000 m from the viewpoint of improving the formability, more preferably 100 to 10,000 m, and even more preferably 1,000 to 7,000 m.

The continuous fiber bundle preferably has an average fineness of 50 to 2000 tex (g/1000 m), more preferably 60 to 800 tex, and even more preferably 60 to 500 tex. Within these ranges, the continuous fiber will more easily be processed, and an obtainable woven fabric will have improved elastic modulus and strength.

Average tensile modulus of the continuous fiber bundle is preferably 50 to 1000 GPa. Within the range, a formed article will have an improved strength.

The continuous fiber bundle preferably has an average tensile modulus of 50 to 1000 GPa, and more preferably 200 to 700 GPa.

The continuous fiber is exemplified by inorganic fibers such as glass fiber, carbon fiber, metal fiber, boron fiber and ceramic fiber; and organic fibers such as aramid fiber, polyoxymethylene fiber, aromatic polyamide fiber, polyparaphenylene benzobisoxazole fiber, and ultra-high molecular weight polyethylene fiber. The inorganic fiber is preferable. Among others, carbon fiber and glass fiber are preferably used owing to their excellent features such as light weight, high strength and high elastic modulus. Carbon fiber is more preferable. The carbon fiber preferably used includes polyacrylonitrile-based carbon fiber and pitchbased carbon fiber. Also carbon fibers from plant origins, such as lignin and cellulose, may also be used.

The continuous fiber used in the first mode of this invention may be treated with a treatment agent. The treatment agent is exemplified by surface treating agent and sizing agent. The amount of consumption of the treatment agent is preferably 0.001 to 1.5% by mass of the continuous fiber, more preferably 0.1 to 1.2% by mass, and even more preferably 0.5 to 1.1% by mass. Within these ranges, the effects of this invention will be demonstrated more effectively.

The surface treating agent is exemplified by those composed of functional compound such as epoxy-based compound, acrylic compound, isocyanate-based compound, silane-based compound, and titanate-based compound, and is further exemplified by silane-based coupling agent and titanate-based coupling agent. The silane-based coupling agent is preferable.

The silane-based coupling agent is exemplified by trialkoxy- or triaryloxysilane compounds such as aminopropyltriethoxysilane, phenylaminopropyltrimethoxysilane, glycidylpropyltriethoxysilane, methacryloxypropyltrimethoxysilane, and vinyltriethoxysilane; ureidosilane; sulfidosilane; vinylsilane; and imidazolesilane.

The sizing agent is exemplified by epoxy-based resins such as bisphonol A-type epoxy resin; and vinyl ester resins including bisphenol A-type vinyl ester resins which are epoxy acrylate resins having an acryl group or methacryl group in one molecule of vinyl ester resin, novolac-type vinyl ester resin, and brominated vinyl ester resin. The sizing agent may also be a urethane-modified resins of epoxy-based resin or vinyl ester-based resin.

Only a single species of the treatment agent may be used independently, or two or more species thereof may be used in combination.

Method of treating the continuous fiber with the treatment agent may be any of known methods. An exemplary method is such as immersing the continuous fiber into a liquid (aqueous solution, for example) containing the treatment agent to thereby allow the treatment agent to adhere to the surface of the continuous fiber. The treatment agent may alternatively be air-blown onto the surface of the continuous fiber. It is alternatively possible to use a commercially available continuous fiber having been treated with the treatment agent, or to use such commercial product after once removing the preliminarily applied treatment agent, and then re-treating it with a desired amount of treatment agent.

<Mouthpiece, Valve, Boss>

A mouthpiece 3 has a near-cylindrical shape, and is fitted and fixed between a liner 1 and an outer layer 2. A near-cylindrical opening of the mouthpiece 3 functions as an opening of a pressure vessel 10. The mouthpiece 3 may be composed of metal such as stainless steel, aluminum or the like, or may be made of resin. A valve 5 is externally threaded on the cylindrical portion thereof, which is screwed into a female screw internally threaded on the inner surface of the mouthpiece 3, to thereby close the opening of the mouthpiece 3. A boss 4 is typically made of aluminum, and is assembled so as to make a part thereof exposed to the outside, so as to conduct heat generated or absorbed in tank to the outside. In this invention, the mouthpiece 3, the boss 4 and the valve 5 may be replaced with any other known means, and are therefore not essential constituent features of the pressure vessel according to the first mode of this invention.

<Layer Between Liner and Outer Layer>

The pressure vessel of the first mode of this invention may contain a single layer, or two or more layers between the liner 1 and the outer layer 2. Such layer is exemplified by a metal layer for reinforcing the liner, and a layer for enhancing adhesion between the liner and the outer layer.

<Layer Outside the Outer Layer>

The pressure vessel of the first mode of this invention may further contain a single layer or two or more layers outside the outer layer. Such layer is exemplified by a layer containing a paint or rust-proofing agent, and a protective layer for heat insulation or cold insulation.

Method for Manufacturing Pressure Vessel

A method for manufacturing a pressure vessel described in the first mode is selectable from known methods, without special limitation.

Preferred embodiments of the method for manufacturing a pressure vessel according to the first mode of this invention will be described below. Of course, this invention is not limited to these embodiments.

A first embodiment of the method for manufacturing a pressure vessel according to the first mode of this invention includes applying a composite material, having a polyamide resin impregnated into a continuous fiber, to the outer circumference of a liner, wherein the polyamide resin contains a structural unit derived from diamine and a structural unit derived from dicarboxylic acid, and 50 mol % or more of the structural unit derived from diamine is derived from xylylenediamine.

In this embodiment, the composite material is typically heated. As a result of heating, the outer layer will cure along the liner, to thereby improve the strength of the pressure vessel. If the liner is made of resin, or has a thermoplastic resin layer provided to the surface thereof, the composite material will fuse therewith under heating, and thereby the adhesion between the liner and the outer layer will be improved.

The best time for heating is not specifically limited. The composite material may be heated after it was applied to the outer circumference of the liner, or the composite material immediately after being heated may be applied to the outer circumference of the liner. Alternatively, the composite material may be heated before and after it is applied to the outer circumference of the liner. "Immediately after" in this context means the duration of time over which the polyamide resin can be kept melted, and is typically within one minute.

In the first mode of this invention, it is more preferable to heat the composite material, having a polyamide resin impregnated into a continuous fiber, at a temperature not lower than the melting point of the polyamide resin, after it was applied to the outer circumference of the liner.

The method of applying the composite material, immediately after being heated, to the outer circumference of the liner, does not always need heating after the composite material was applied to the outer circumference of the liner, so that the method is suitable for the liner made of a less heat-resistant material.

Means for thermal bonding is exemplified by ultrasonic welding, vibration welding, and laser welding.

The heating temperature is preferably at and above the melting point of the polyamide resin, more preferably +10° C. higher than the melting point of the polyamide resin, and even more preferably +20° C. higher than the melting point. The upper limit of the heating temperature is preferably +100° C. or less higher than the melting point of the polyamide resin, and more preferably +80° C. or less higher than the melting point. The polyamide resin in this context is a polyamide resin composing the composite material.

The heating time is typically, but not specifically limited to, 10 seconds to 10 minutes.

For the case where the composite material is heated after being applied to the outer circumference of the liner, it is also preferable to heat the outer layer while cooling the liner from inside. This is beneficial in particular when a resin liner that easily melts under heating is used.

The heating may be combined with pressurizing, under a pressing pressure of 1 MPa or higher, more preferably 5 MPa or higher, and particularly 10 MPa or higher. Pressurizing under heating is conducted under reduced pressure, and in particular in vacuo. Under such conditions, the obtainable outer layer will have a reduced void ratio.

Although methods of applying the composite material to the outer circumference of the liner are not specifically limited, so long as the composite material can cover the outer circumference of the liner, it is preferable to apply the composite material so that the continuous fiber is aligned with a certain directionality, such as spiral, vertical or lateral directionality.

In one specific method of application, the composite material is preferably wound around the outer circumference of the liner. The way of winding may follow the filament winding process or tape winding process, depending on embodiments of the composite material. For details, the description in paragraphs 0031 to 0037 of JP-A-H09-280496 may be taken into consideration, the contents of which are incorporated into this specification.

One embodiment of such composite material is exemplified by a tape-like article. Alternatively, a woven fabric, knitted fabric or commingled yarn described later may be heated so as to allow the polyamide resin to infiltrate into the continuous fiber, and the product may be applied to the outer circumference of the liner. Of course, the tape-like composite material and the knitted fabric or the like may be used in combination.

When applying these composite materials, an adhesive or the like may be used.

The composite material may be applied to the surface of the liner. Alternatively, one or two other layers are placed on the surface of the liner, and the composite material may be applied to the surface of such other layer(s).

In an exemplary method, intended to improve the adhesion between the liner and the composite material, a resin layer is provided to the surface of the liner, and the surface of the resin layer is then acidized. Such resin layer is preferably a thermoplastic resin layer.

For the case where the composite material is applied to the surface of the resin liner, the surface of the resin liner may be acidized.

Meanwhile for the case where the composite material is applied to the surface of the metal liner, adhesion with the metal liner may be improved by controlling the terminal amino group concentration of the polyamide resin used for the composite material. For example, a polyamide resin with a terminal amino group concentration ($[NH_2]$) given by $5 \leq [NH_2] \leq 150$ (unit: μeq/g) may be used. The adhesion may alternatively be improved by roughening the surface of the metal liner. By roughening the surface, the metal liner will allow the polyamide resin to infiltrate more easily, will have an increased contact area with the polyamide resin, and can thereby improve the adhesion.

Details of the liner and the composite material are same as explained previously for the liner and the composite material of the pressure vessel, while specified by the same preferable ranges.

A method for manufacturing a pressure vessel according to the second embodiment includes applying a woven fabric, knitted fabric or commingled yarn, composed of the polyamide resin fiber and the continuous fiber, to the outer circumference of the liner, followed by heating at a temperature not lower than the melting point of the polyamide resin, so as to impregnate the polyamide resin into the continuous fiber, wherein the polyamide resin contains a structural unit derived from diamine and a structural unit derived from dicarboxylic acid, and xylylenediamine accounts for 50 mol % or more of the structural unit derived from diamine.

The woven fabric is typically a woven fabric in which either one of the warp and the weft is a continuous polyamide resin fiber composed of the polyamide resin composition, and the other is a continuous fiber. The commingled yarn is typically a commingled yarn composed of a continuous polyamide resin fiber and a continuous fiber. The commingled yarn is preferably twisted. Woven fabric and knitted fabric using such commingled yarn are also employable. Other features are same as those described in the first embodiment of the method for manufacturing a pressure vessel, while specified by the same preferable ranges.

The method for manufacturing a pressure vessel according to the third embodiment of the first mode of this invention includes applying the continuous fiber to the outer circumference of the liner, and allowing the polyamide resin to infiltrate therein, wherein the polyamide resin contains a structural unit derived from diamine and a structural unit derived from dicarboxylic acid, and xylylenediamine accounts for 50 mol or more of the structural unit derived from diamine.

As a method of allowing the polyamide resin to infiltrate into the continuous fiber having been wound around the outer circumference of the liner, employable is a method of simply winding the continuous fiber, and then allowing the polyamide resin to infiltrate therein typically in vacuo, by the resin transfer molding (RTM) process. Other requirements are same as those for the method for manufacturing a pressure vessel according to the first embodiment, while specified by the same preferable ranges.

Liner

A second mode of this invention relates to the liner for the pressure vessel, composed of a composite material in which the polyamide resin is impregnated into the continuous fiber. Although in most cases the liner of the pressure vessel according to this embodiment is composed of composite material only, it does not preclude inclusion of other components without departing from the spirit of this invention.

The gas transmission coefficient of the liner according to the second mode of this invention, at 23° C. and 50% relative humidity, is synonymous to the gas transmission coefficient of the outer layer of the pressure vessel described previously in the first mode of this invention, at 23° C. and 50% relative humidity, while specified by the same preferable ranges.

The void ratio of the liner according to the second mode of this invention is synonymous to the void ratio of the outer layer of the pressure vessel according to the first mode of this invention, while specified by the same preferable ranges.

The thickness of the liner according to the second mode of this invention is preferably, but not specifically limited to, 100 to 6000 μm, and more preferably 400 to 4000 μm.

The ratio of the continuous fiber in the liner according to the second mode of this invention is same as the ratio of the continuous fiber in the outer layer of the pressure vessel described previously in the first mode of this invention, while specified by the same preferable ranges.

The liner according to the second mode of this invention preferably has the continuous fiber regularly aligned therein. "Regularly aligned" in this context means that 70% by mass or more of the continuous fiber contained in the liner is aligned with a certain directionality. "A certain directionality" is exemplified by spiral, vertical and lateral directionalities, and combination of them. Note that the spiral, vertical and lateral in the context of this invention encompass not only the spiral arrangement or the like in a strict sense, but also those containing errors to some degree that are generally acceptable by those skilled in the art.

<Composite Material>

The composite material used in the second mode of this invention contains the continuous fiber, and the polyamide resin impregnated into the continuous fiber, and may be composed of the continuous fiber and the polyamide resin composition impregnated into the continuous fiber.

In the composite material used in the second mode of this invention, the continuous fiber and the polyamide resin preferably account for 80% by mass or more of the total.

<<Polyamide Resin>>

The composite material used in the second mode of this invention contains a polyamide resin. The polyamide resin is exemplified by polyamide 66, polyamide 6, polyamide 46, polyamide 6/66, polyamide 10, polyamide 612, polyamide 11, polyamide 12, polyamide 66/6T composed of hexamethylenediamine, adipic acid and terephthalic acid, polyamide 6I/6T composed of hexamethylenediamine, isophthalic acid and terephthalic acid, and polyamide resin containing at least one aromatic ring in the structural unit derived from diamine.

In the second mode of this invention, preferable is the polyamide resin containing at least one aromatic ring in the structural unit derived from diamine, and more preferably is the polyamide resin containing the structural unit derived from diamine and the structural unit derived from dicarboxylic acid, wherein xylylenediamine accounts for 50 mol % or more of the structural unit derived from diamine. Such polyamide resin is synonymous to the polyamide resin described previously regarding the composite material used in the first mode, while specified by the same preferable ranges.

Except for the features described above, the composite material used in the second mode of this invention is synonymous to the composite material used in the first mode of this invention, while specified by the same preferable ranges.

<Method for Manufacturing Liner>

The liner according to the second mode of this invention may be manufactured by any of known methods. The liner in the second mode of this invention will suffice if it is composed of a composite material having the polyamide resin impregnated into the continuous fiber. In other words, it will suffice that, when given in the form of liner, the polyamide resin remains impregnated into the continuous fiber. An exemplary method may, therefore be such as arranging the composite material, typically as a tape-like article, having the polyamide resin or polyamide resin composition impregnated into the continuous fiber, in the form of liner and then heating it; or such as arranging the woven fabric or commingled yarn, composed of the polyamide resin fiber and the continuous fiber, in the form of liner, and then heating the work to be formed while allowing the polyamide resin to infiltrate into the continuous fiber. Still another embodiment may be such as arranging the continuous fiber in the form of liner, and then allowing the polyamide resin to infiltrate therein.

The tape-like composite material may be manufactured by a method of impregnating a molten polyamide resin into the continuous fiber, having been paralleled in one direction, while opening it; or by a method of impregnating the polyamide resin to the continuous fiber, by placing a polyamide resin film on the continuous fiber having been paralleled in one direction, and then heating the stack.

The woven fabric is exemplified by a fabric in which either one of the warp and the weft is the continuous polyamide resin fiber composed of the polyamide resin composition, and the other is the continuous fiber. The commingled yarn is exemplified by a commingled yarn composed of the continuous polyamide resin fiber and the continuous fiber. The commingled yarn is preferably twisted. Woven fabric and knitted fabric using such commingled yarn are also employable.

In the second mode of this invention, it is preferable to wind the composite material, the woven fabric or the commingled yarn around the outer circumference of a mold according to the filament winding process or tape winding process, and then to remove the mold after heating and forming. The liner may be manufactured alternatively by applying the continuous fiber around the outer circumference of a mold according to the resin transfer molding (RTM) process, and then impregnating therein the polyamide resin typically in vacuo.

The liner may be manufactured using a cylindrical mold, wherein the upper and lower portions may separately be formed by heating, or, the liner may integrally be formed, wherein the mold is removed through the opening of the liner.

The mold, to be finally removed through the opening of the liner, is exemplified by a ceramic mold which is removable by cracking.

The heating temperature is necessarily not lower than a temperature at which the polyamide resin or polyamide resin composition can melt, and is preferably +10° C. or more higher than the melting point of the polyamide resin, and more preferably +20° C. or more, although variable depending on types and molecular weights of the polyamide resin. The upper limit of the heating temperature is preferably +100° C. or less higher than the melting point of the polyamide resin, and more preferably +80° C. or less. The polyamide resin in this context is a polyamide resin composing the composite material.

The heating time is typically, but not specifically limited to, 10 seconds to 10 minutes.

The heating may be combined with pressurizing, under a pressing pressure of 1 MPa or higher, more preferably 5 MPa or higher, and particularly 10 MPa or higher. Pressurizing under heating is conducted under reduced pressure, and in particular in vacuo. Under such conditions, the obtainable liner will have a reduced void ratio.

The liner of the second mode of this invention may be used as a liner for the pressure vessel. Typically as illustrated in FIG. 1, the liner according to the second mode of this invention may be used as the liner 1, and the protective layer or the like may be used as the outer layer 2. The mouthpiece 3, the boss 4, and the valve 5 are same as those explained previously referring to FIG. 1.

Although the protective layer is a layer for heat insulation or cold insulation, it is not an essential constituent feature in the pressure vessel according to the second mode of this invention. The layer provided outside of the liner 1 is not limited to the protective layer, but also may be a layer containing a paint or rust-proofing agent.

The outer layer used in the second mode may be the outer layer described in the first mode of this invention. In this case, the composite material composing the liner and the composite material composing the outer layer may be same or different, but would be different in most cases.

Only a single outer layer may be provided, or two or more outer layers may be provided. Alternatively, the liner may have on the surface thereof no layer at all.

In particular, since the liner per se according to the second mode of this invention has an excellent gas barrier property, so that the pressure vessel may also be configured without providing to the body portion thereof a layer other than the liner, having a gas transmission coefficient at 23° C., 50% relative humidity of 0.10 cc·mm/m$^2$·day·atm or smaller. This is advantageous to reduce the number of layers composing the pressure vessel, and to reduce the weight of the pressure vessel.

EXAMPLES

This invention will further be detailed below referring to Examples. Note that materials, amounts of consumption, ratios, process details, and process procedures described in Examples below may properly be modified without departing from the spirit of this invention. Accordingly, the scope of this invention is by no means limited by the specific examples illustrated below.

<Synthesis of Polyamide Resin MXD6>

In a 50-liter reaction vessel equipped with a stirrer, a partial condenser, a total condenser, a thermometer, a dropping funnel, a nitrogen introducing pipe and a strand die, placed were precisely weighed 15000 g (102.6 mol) of adipic acid, 12978 mg (122.5 mmol, equivalent to a phosphorus atom concentration in polyamide of 151 ppm) of sodium hypophosphite monohydrate, and 6914 mg (84.29 mmol) of sodium acetate, the inner atmosphere of the vessel was thoroughly replaced with nitrogen, and the reaction system was heated up to 170° C. under stirring with an additional small amount of nitrogen gas flow. To the mixture kept under stirring, 13895 g (102.0 mol) of metaxylylenediamine was added dropwise, and the reaction system was continuously heated, while removing water resulted from the condensation out of the system. Upon completion of the dropwise addition of metaxylylenediamine, the reaction was allowed to proceed at an internal temperature of 260° C. for 40 minutes. The reaction system was then pressurized with nitrogen, and the resultant polymer was taken out through the strand die and pelletized. Approximately 24 kg of polyamide resin MXD6 was obtained.

<Synthesis of Polyamide Resin MXD6I>

Polyamide resin MXD6I was obtained by melt polymerization in the same way as in the synthesis of polyamide resin MXD6, except that 14094.3 g (96.444 mol) of adipic acid and 1022.8 g (6.156 mol) of isophthalic acid were added as the dicarboxylic acid component, rather than adipic acid only.

<Synthesis of Polyamide Resin MP10>

In a 50-liter reaction vessel equipped with a stirrer, a partial condenser, a condenser, a thermometer, a dropping device, a nitrogen introducing pipe and a strand die, placed were precisely weighed 8950 g (44.25 mol) of sebacic acid (sebacic acid TA, from Ito Oil Chemicals Co., Ltd.), 12.54 g (0.074 mol) of calcium hypophosphite, and 6.45 g (0.079 mol) of sodium acetate. The inner atmosphere of the reaction vessel was thoroughly replaced with nitrogen and pressurized with nitrogen up to 0.4 MPa, and the content was heated from 20° C. to 190° C. under stirring over 55 minutes to uniformly melt sebacic acid. Next, a mixed diamine containing 4172 g (30.63 mol) of metaxylylenediamine and 1788 g (13.13 mol %) of paraxylylenediamine was added dropwise to the content kept under stirring. In this duration, the internal temperature of the reaction vessel was continuously elevated up to 293° C. During the dropwise addition, the pressure was controlled at 0.42 MPa, and the produced water was removed through the partial condenser and the condenser out of the system. The temperature of the partial condenser was controlled within the range from 145 to 147° C. Upon completion of the dropwise addition of the mixed diamine, the polycondensation reaction was allowed to continue at an internal pressure of the reaction vessel of 0.42 MPa for 20 minutes. In this duration, the internal temperature of the reaction vessel was elevated up to 296° C. The internal pressure of the reaction vessel was then reduced from 0.42 MPa down to 0.12 MPa over 30 minutes. In this duration, the internal temperature elevated up to 298° C. The inner atmosphere was then reduced at a rate of 0.002 MPa/min, down to 0.08 MPa over 20 minutes, so as to control the amount of components having molecular weights of 1,000 or smaller. The internal temperature of the reaction vessel upon completion of the evacuation was 301° C. The reaction system was then pressurized with nitrogen, and while keeping the internal temperature of the reaction vessel at 301° C. and the resin temperature at 301° C., the resultant polymer was taken out through the strand die, cooled in a cooling water of 20° C., and then pelletized. Approximately 13 kg of polyamide resin was obtained.

<Other Polyamide Resin>

PA6: UBE Nylon 1022B (nylon 6), from Ube Industries, Ltd.

<Continuous Fiber>

CF: carbon fiber, surface-treated with an epoxy-resin, from Toray Industries, Inc.

<Other Composite Material>

TenCate Cetex (registered trademark) TC910 Nylon 6, a unidirectional carbon fiber tape impregnated with polyamide 6 (PA6), from TenCate Advanced Composites Example 1-1

Polyamide resin MXD6 was extruded from a single-screw extruder equipped with a 30 mm-diameter screw and a T-die, to obtain a cast film of 20 μm thick.

Carbon fiber, in the form of continuous fiber bundle, was opened by introducing it into an air flow with an average flow rate of 20 m/sec, from a direction nearly normal to the air flow, so as to make the fiber sagged by 60 mm per a travel length of 30 mm (10 mm sagging per 20 mm travel) across the air flow, to obtain a carbon fiber sheet.

The obtained carbon fiber sheet was heated and kept at 280° C. (referred to as "impregnation temperature", hereinafter), and continuously bonded with the cast film, to obtain a tape-like composite material of 200 mm width.

Polyamide resin MXD6 was molded by blowing to obtain a liner that measures 100 mm in outer diameter, 300 mm in length, and 3 mm in thickness.

The tape-like composite material was then spirally wound around the thus-obtained liner based on the tape winding process. The tape was wound so as to be double-layered or more. The work was then heated at 280° C. to obtain the body of pressure vessel. Metal lids were attached to the thus-obtained body of pressure vessel to obtain a pressure vessel.

Void ratio of the outer layer, ratio of continuous fiber in the outer layer, oxygen transmission coefficient of the outer layer, argon transmission coefficient of the outer layer, nitrogen transmission coefficient of the outer layer, and retention rate of flexural strength after one-month immersion in water were measured according to the methods below.

<<Method of Measuring Void Ratio of Outer Layer>>

The void ratio of the outer layer was measured according to the method below.

A part of the outer layer was cut off, the obtained piece was embedded into an epoxy resin, polished so as to expose a cross-section in the thickness direction of the outer layer (in this Example, the cross-section illustrated in FIG. 1), and the cross-section was photographed using a ultradepth color 3D profile microscope VK-9500 (controller unit)/VK-9510 (measurement unit) (from Keyence Corporation). Void regions were selected from the obtained cross-sectional image using image analyzing software "ImageJ", and the area thereof was measured. Using the measured value, (area of void regions appeared in cross-section of outer layer/cross-sectional area of outer layer)×100 was calculated. Every outer layer was measured at three points, and the measured values were averaged and then rounded off to the whole number to determine the void ratio (unit: %).

<<Method of Measuring Ratio of Continuous Fiber in Outer Layer>>

The ratio of the continuous fiber in the outer layer was measured by the method below.

The ratio of the continuous fiber in the outer layer was measured by the combustion method specified by JIS 7075.

The ratio of the continuous fiber in the outer layer was given in v/v %.

<<Method of Measuring Oxygen Transmission Coefficient of Outer Layer>>

The oxygen transmission coefficient of the composite material obtained above, at 23° C. and 50% relative humidity, was measured according to the method below.

The oxygen transmission rate of the composite material was measured using an oxygen transmission instrument (OX-TRAN2/21, from MOCON, Inc.) at 23° C. and 60% relative humidity, and the oxygen transmission coefficient of the composite material was determined using the equation below:

$$1/R_1 = DFT/P$$

$$P = R_1 * DFT$$

where,
$R_1$=oxygen transmission rate of composite material (ml/m²·day·MPa);
DFT=thickness of composite material (mm); and
P=oxygen transmission coefficient of composite material.

The gas transmission coefficient was given in ml/m²·day·MPa and ml·mm/m²·day·atm by conversion. The gas transmission coefficient is a value unique to each material, not relevant to the thickness. The transmission coefficient of the composite material is therefore equal to the gas transmission coefficient of the outer layer.

<<Method of Measuring Argon Transmission Coefficient of Outer Layer>>

The argon gas transmission rate of the composite material was measured using a gas transmission analysis system (GTR Tech Corporation) at 23° C. and 50% relative humidity, based on the differential pressure method specified by JIS K7126-1:2006, and the argon transmission coefficient was determined in the same way as described in the method of determining the oxygen transmission coefficient of the outer layer.

<<Method of Measuring Nitrogen Transmission Coefficient of Outer Layer>>

The nitrogen gas transmission rate of the composite material was measured using a gas transmission analysis system (GTR Tech Corporation) at 23° C. and 50% relative humidity, based on the differential pressure method specified by JIS K7126-1:2006, and the nitrogen transmission coefficient was determined in the same way as described in the method of determining the oxygen transmission coefficient of the outer layer.

<<Retention Rate of Flexural Strength after One-Month Immersion in Water>>

The composite materials were alternately stacked so as to align the continuous fibers nearly orthogonal to each other, wound around the liner, and heated at a temperature listed in Table below, to thereby manufacture a test piece that measures 10 mm×80 mm×4 mm (thickness). The thus obtained test piece was measured for flexural strength (MPa) at normal temperature, using Autograph (AG5000B from Shimadzu Corporation) in compliance with JIS K6911. The test piece was immersed in water at normal temperature under normal pressure for one month, and the flexural strength was measured in the same way. (Flexural strength before immersion/flexural strength after immersion)×100 was defined as the retention rate (%) of flexural strength after one-month immersion in water.

Examples 1-2 to 1-8

Pressure vessels of Examples 1-2 to 1-8 were obtained in the same way as in Example 1-1, except that the types of resin, impregnation temperature, and heating temperature after winding around the liner were modified as summarized in Table 1 below. Example 1-7 and Example 1-8 were conducted in the same way as Example 1-1, except that a mixture of pellets of polyamide resin MXD6 and PA6 was extruded from a single-screw extruder equipped with a 30 mm-diameter screw and a T-die, to thereby obtain a cast film of 20 μm thick.

Example 1-9

A pressure vessel was obtained in the same way as in Example 1-1, except that TenCate Cetex TC910 Nylon 6 was used as the composite material.

Results are summarized in Table 1 below.

TABLE 1

|  | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|
| Type of Resin | MXD6 | MXD6 | MXD6I | MXD6 | MP10 | MXD6 | MXD6/PA6 = 80/20 (mass ratio) | MXD6/PA6 = 30/70 (mass ratio) | PA6 |
| Impregnation Temperature (° C.) | 280 | 290 | 290 | 290 | 280 | 270 | 290 | 290 | |
| Heating Temperature after Winding around Liner (° C.) | 280 | 290 | 290 | 290 | 280 | 290 | 290 | 290 | 280 |

TABLE 1-continued

|  | Example1-1 | Example1-2 | Example1-3 | Example1-4 | Example1-5 | Example1-6 | Example1-7 | Example1-8 | Example1-9 |
|---|---|---|---|---|---|---|---|---|---|
| Void Ratio of Outer Layer (unit: %) | 1 | 5 | 1 | 1 | 1 | 13 | 2 | 4 | 3 |
| Ratio of Continuous Fiber in Outer Layer (V/V %) | 48 | 48 | 48 | 56 | 56 | 48 | 48 | 48 | 61 |
| Oxygen Transmission Coefficient of Outer Layer (ml/m$^2$ · day · MPa) | 0.0003 | 0.0007 | 0.0004 | 0.0002 | 0.009 | 0.0137 | 0.0008 | 0.0091 | 0.0169 |
| Oxygen Transmission Coefficient of Outer Layer (ml/m$^2$ · day · atm) | 0.003 | 0.007 | 0.004 | 0.002 | 0.089 | 0.135 | 0.008 | 0.09 | 0.167 |
| Argon Transmission Coefficient of Outer Layer (ml/m$^2$ · day · MPa) | 0.0002 | 0.0005 | 0.0002 | 0.0001 | 0.0089 | 0.0133 | 0.0003 | 0.0089 | 0.016 |
| Argon Transmission Coefficient of Outer Layer (ml/m$^2$ · day · atm) | 0.001 | 0.005 | 0.001 | 0.001 | 0.088 | 0.132 | 0.003 | 0.088 | 0.158 |
| Nitrogen Transmission Coefficient of Outer Layer (ml/m$^2$ · day · MPa) | 0.0002 | 0.0006 | 0.0002 | 0.0001 | 0.0081 | 0.0135 | 0.0005 | 0.009 | 0.0169 |
| Nitrogen Transmission Coefficient of Outer Layer (ml/m$^2$ · day · atm) | 0.002 | 0.006 | 0.002 | 0.001 | 0.08 | 0.133 | 0.005 | 0.089 | 0.167 |
| Retention Rate of Flexural Strength after One-Month Immersion in Water (%) | 79 | 78 | 80 | 80 | 86 | 74 | 75 | 70 | 62 |

As is clear from the results, the outer layer of the pressure vessels of the first mode of this invention showed small values of the gas transmission coefficient. In particular by controlling the void ratio to 10% or lower, it became possible to distinctively reduce the gas transmission coefficient and to keep high retention rate of flexural strength after one-month immersion in water.

The pressure vessels of the first mode of this invention were also found to show excellent adhesion between the liner and the outer layer, owing to use of the same polyamide resin for the liner and the composite material.

Example 2-1

The tape-like composite material manufactured above in Example 1-1 was spirally wound around a ceramic mold according to the tape winding process. The tape was spirally wound two directions so as to be double-layered. The article was heated to 280° C. for melt forming. The ceramic mold was cracked and removed, to thereby obtain the liner.

The void ratio of the liner, the ratio of continuous fiber in the liner, the oxygen transmission coefficient of the liner, the argon transmission coefficient of the liner, the nitrogen transmission coefficient of the liner, and the retention rate of flexural strength of the liner after one-month immersion in water were measured in the same way as described in Example 1-1, except that the outer layer manufactured in Example 2-1 was used in place of the outer layer manufactured in Example 1, for the individual measurements.

Examples 2-2 to 2-8

The liners in Examples 2-2 to 2-8 were obtained in the same way as described in Example 2-1, except that the types of resin, impregnation temperature, and heating temperature after winding around the liner were modified as summarized in Table 2 below. Example 2-7 and Example 2-8 were conducted in the same way as Example 2-1, except that a mixture of pellets of polyamide resin MXD6 and PA6 was extruded from a single-screw extruder equipped with a 30 mm-diameter screw and a T-die, to thereby obtain a cast film of 20 μm thick.

Exemplary Experiments 2-9

The liner was obtained in the same way as in Exemplary Experiment 2-1, except that TenCate Cetex TC910 Nylon 6 was used as the composite material.

Results are summarized in Table 2 below.

TABLE 2

|  | Example2-1 | Example2-2 | Example2-3 | Example2-4 | Example2-5 | Example2-6 | Example2-7 | Example2-8 | Example2-9 |
|---|---|---|---|---|---|---|---|---|---|
| Type of Resin | MXD6 | MXD6 | MXD6I | MXD6 | MP10 | MXD6 | MXD6/PA6 = 80/20 (mass ratio) | MXD6/PA6 = 30/70 (mass ratio) | PA6 |

TABLE 2-continued

|  | Example2-1 | Example2-2 | Example2-3 | Example2-4 | Example2-5 | Example2-6 | Example2-7 | Example2-8 | Example2-9 |
|---|---|---|---|---|---|---|---|---|---|
| Impregnation Temperature (° C.) | 280 | 290 | 290 | 290 | 280 | 270 | 290 | 290 | |
| Heating Temperature (° C.) | 280 | 290 | 290 | 290 | 280 | 290 | 290 | 290 | 280 |
| Void ratio of Liner (Unit: %) | 1 | 5 | 1 | 1 | 1 | 13 | 2 | 4 | 3 |
| Ratio of Continuous Fiber in Liner (V/V %) | 48 | 48 | 48 | 56 | 56 | 48 | 48 | 48 | 61 |
| Oxygen Transmission Coefficient of Liner (ml/m² · day · MPa) | 0.0003 | 0.0007 | 0.0004 | 0.0002 | 0.009 | 0.0137 | 0.0008 | 0.0091 | 0.0169 |
| Oxygen Transmission Coefficient of Liner (ml/m² · day · atm) | 0.003 | 0.007 | 0.004 | 0.002 | 0.089 | 0.135 | 0.008 | 0.09 | 0.167 |
| Argon Transmission Coefficient of Liner (ml/m² · day · MPa) | 0.0002 | 0.0005 | 0.0002 | 0.0001 | 0.0089 | 0.0133 | 0.0003 | 0.0089 | 0.016 |
| Argon Transmission Coefficient of Liner (ml/m² · day · atm) | 0.001 | 0.005 | 0.001 | 0.001 | 0.088 | 0.132 | 0.003 | 0.088 | 0.158 |
| Nitrogen Transmission Coefficient of Liner (ml/m² · day · MPa) | 0.0002 | 0.0006 | 0.0002 | 0.0001 | 0.0081 | 0.0135 | 0.0005 | 0.009 | 0.0169 |
| Nitrogen Transmission Coefficient of Liner (ml/m² · day · atm) | 0.002 | 0.006 | 0.002 | 0.001 | 0.08 | 0.133 | 0.005 | 0.089 | 0.167 |
| Retention Rate of Flexural Strength after One-Month Immersion in Water(%) | 79 | 78 | 80 | 80 | 86 | 74 | 75 | 70 | 62 |

As is clear from the results, the liners of the second mode of this invention were found to show small values of gas transmission coefficient.

REFERENCE SIGNS LIST

1 liner
2 outer layer
3 mouthpiece
4 boss
5 valve
10 pressure vessel

What is claimed is:
1. A pressure vessel comprising:
  a liner and an outer layer of the liner,
    wherein the outer layer is configured by a composite material that contains a continuous fiber and a polyamide resin impregnated into the continuous fiber, the outer layer having a void ratio of 10% or smaller;
    the polyamide resin of the outer layer contains a structural unit derived from diamine and a structural unit derived from dicarboxylic acid; and
    70 mol % or more of the structural unit derived from diamine is derived from metaxylylenediamine,
    70 mol % or more of the structural unit derived from dicarboxylic acid is derived from adipic acid,
  wherein the liner is composed of at least 50% by mass or more of a polyamide resin,
    the polyamide resin of the liner comprises a structural unit derived from diamine and a structural unit derived from dicarboxylic acid, wherein 50 mol % or more of the structural unit derived from diamine is derived from xylylenediamine,
  wherein 90% by mass or more of the polyamide resin used for the composite material and 90% by mass or more of the polyamide resin used for the liner are the same polyamide resin.

2. The pressure vessel of claim 1, wherein the outer layer has a gas transmission coefficient at 23° C. and 50% relative humidity of 0.10 ml·mm/m²·day·atm or smaller.

3. The pressure vessel of claim 1, wherein the continuous fiber is at least one fiber selected from carbon fiber and glass fiber.

4. The pressure vessel of claim 1, wherein the ratio of the continuous fiber in the outer layer is 10 to 80 V/V %.

5. A pressure vessel comprising:
  a liner composed of a composite material having a polyamide resin impregnated into a continuous fiber,
    the liner being the inner most layer of the pressure vessel and the only gas barrier layer in a body portion of the pressure vessel, and
    the liner having a gas transmission coefficient at 23° C., 50% relative humidity of 0.10 cc·mm/m²·day·atm or less.

6. The pressure vessel of claim 5, wherein the polyamide resin contains a structural unit derived from diamine and a structural unit derived from dicarboxylic acid, and 50 mol % or more of the structural unit derived from diamine is xylylenediamine.

7. The pressure vessel of claim 6, wherein 70 mol % or more of the structural unit derived from diamine is derived from metaxylylenediamine.

8. The pressure vessel of claim 6, wherein 70 mol % or more of the structural unit derived from dicarboxylic acid is derived from a straight chain aliphatic am-dicarboxylic acid having 4 to 20 carbon atoms.

9. The pressure vessel of claim 6, wherein 70 mol % or more of the structural unit derived from diamine is derived from metaxylylenediamine, and 70 mol % or more of the structural unit derived from dicarboxylic acid is derived from at least either one of adipic acid and sebacic acid.

10. The pressure vessel of claim 6, wherein 70 mol % or more of the structural unit derived from diamine is derived from metaxylylenediamine, and 70 mol % or more of the structural unit derived from dicarboxylic acid is derived from adipic acid.

11. The pressure vessel of claim 5, wherein the liner has a void ratio of 10% or smaller.

12. The pressure vessel of claim 5, wherein the continuous fiber is at least one fiber selected from carbon fiber and glass fiber.

13. The pressure vessel of claim 5, wherein the ratio of the continuous fiber in the liner is 10 to 80 V/V %.

* * * * *